(12) United States Patent
Takagi et al.

(10) Patent No.: US 9,402,367 B2
(45) Date of Patent: Aug. 2, 2016

(54) PET SHEET AND PET SHEET FOR PACKAGING BODY

(71) Applicant: UNI-CHARM CORPORATION, Ehime (JP)

(72) Inventors: Chiyo Takagi, Kagawa (JP); Takeshi Ikegami, Kagawa (JP)

(73) Assignee: Uni-Charm Corporation, Ehime (JP)

( * ) Notice: Subject to any disclaimer, the term of this patent is extended or adjusted under 35 U.S.C. 154(b) by 0 days.

(21) Appl. No.: 14/412,972

(22) PCT Filed: Jun. 20, 2013

(86) PCT No.: PCT/JP2013/067010
§ 371 (c)(1),
(2) Date: Jan. 5, 2015

(87) PCT Pub. No.: WO2014/007072
PCT Pub. Date: Jan. 9, 2014

(65) Prior Publication Data
US 2015/0189853 A1    Jul. 9, 2015

(30) Foreign Application Priority Data
Jul. 6, 2012 (JP) ................................. 2012-152296

(51) Int. Cl.
*A01K 1/01* (2006.01)
*A01K 1/015* (2006.01)

(52) U.S. Cl.
CPC ............. *A01K 1/0157* (2013.01); *A01K 1/0107* (2013.01); *A01K 1/0152* (2013.01)

(58) Field of Classification Search
CPC . A01K 1/0107; A01K 1/0125; A01K 1/0152; A01K 1/0353; A01K 23/005
USPC .................. 119/171, 167, 168, 169, 170, 172
See application file for complete search history.

(56) References Cited

U.S. PATENT DOCUMENTS

| 5,630,376 | A | * | 5/1997 | Ochi | ................. | A01K 1/0107 119/169 |
| 5,797,347 | A |   | 8/1998 | Ochi | | |
| 7,493,870 | B2 | * | 2/2009 | Takahashi | ............ | A01K 1/0107 119/171 |

(Continued)

FOREIGN PATENT DOCUMENTS

| JP | H09-037670 |   | 2/1997 |
| JP | H10-313721 | A | 12/1998 |
| JP | H10-313722 | A | 12/1998 |

OTHER PUBLICATIONS

International Search Report from corresponding PCT application No. PCT/JP2013/067010 dated Aug. 27, 2013 (4 pgs).

*Primary Examiner* — Yvonne Abbott-Lewis
(74) *Attorney, Agent, or Firm* — Brinks Gilson & Lione (57) ABSTRACT

A pet sheet for pet excrement has a fluid-permeable surface sheet and a fluid-impermeable rear sheet. The pet sheet has a first folded section and a second folded section that are formed by the folding of the surface sheet and the rear sheet so as to protrude on the surface sheet side. The surface sheet and the rear sheet positioned on both sides of the first folded section and the second folded section, respectively, are configured so as to fold out and be used as the pet sheet. Ridge lines formed in the surface sheet in the first folded section and the second folded section extend continuously along a first direction parallel to the surface sheet, from one end of the surface sheet in the first direction to the other end thereof.

15 Claims, 6 Drawing Sheets

(56) References Cited

U.S. PATENT DOCUMENTS

| | | | | |
|---|---|---|---|---|
| 7,748,348 B2* | 7/2010 | Hurwitz | ............... | A01K 1/0107 119/168 |
| 7,891,320 B2* | 2/2011 | Otsuji | ................... | A01K 1/0107 119/169 |
| 8,960,127 B2* | 2/2015 | Miller | ................... | A01K 1/0107 119/169 |
| 2004/0147898 A1* | 7/2004 | Mizutani | ........... | A61F 13/47209 604/385.17 |
| 2012/0292224 A1* | 11/2012 | Matsushima | .......... | B65D 33/01 206/525 |

* cited by examiner

PET SHEET AND PET SHEET FOR PACKAGING BODY

RELATED APPLICATIONS

This application is a 35 U.S.C. §371 national phase filing of International Patent Application No. PCT/JP2013/067010, filed Jun. 20, 2013, through which and to which priority is claimed under 35 U.S.C. §119 to Japanese Patent Application No. 2012-152296, filed Jul. 6, 2012.

TECHNICAL FIELD OF THE INVENTION

The present invention relates to a pet sheet for receiving pet excrement and a pet sheet packaging body including a package in which the pet sheet is stored.

BACKGROUND ART

Japanese non-examined laid-open Patent Publication JP H9-37670 A discloses an absorbent panel for pets. The absorbent panel has a liquid-absorbent core panel between a top sheet and a back sheet. The core panel has a relatively thin central region and a relatively thick edge region. Thus, the absorbent panel is configured such that an edge region of the top side of the absorbent panel is higher than its central region or protrudes on the top side, while its back side is flat. With such a structure, urine is prevented from leaking out from a peripheral edge region of the absorbent panel.

PRIOR ART DOCUMENT

Patent Document

Patent Document 1: Japanese non-examined laid-open Patent Publication JP H9-37670 A

SUMMARY OF THE INVENTION

Problem to be Solved by the Invention

In the above-described pet absorbent panel, having the relatively thin region and the relatively thick region, the structure of the absorbent panel is complicated. Accordingly, it is an object of the present invention to provide a new technique for preventing urine, etc. from leaking out from the pet sheet.

Means for Solving the Problem

In order to solve the above-described problem, a pet sheet according to the present invention is configured as a pet sheet for pet excrement that has a liquid-permeable top sheet and a liquid-impermeable back sheet. The pet sheet has a first mountain fold and a second mountain fold that are formed by folding the top sheet and the back sheet so as to protrude on the top sheet side. The pet sheet is configured such that the top sheet and the back sheet which extend on both sides of the first mountain fold and the second mountain fold are unfolded when used as the pet sheet. Ridge lines of the first mountain fold and the second mountain fold that are formed on the top sheet extend along a first direction parallel to the top sheet and continuously from one end to the other end of the top sheet in the first direction. The mountain fold is formed by folding the top sheet and the back sheet so as to protrude on the top sheet side and is also merely referred to as a fold.

According to the present invention, with the structure in which the first mountain fold and the second mountain fold are formed, pet excrement is retained in a region formed by the top sheet and the back sheet between the first mountain fold and the second mountain fold, and can be prevented from leaking outside the first mountain fold and the second mountain fold. Specifically, the first mountain fold and the second mountain fold are formed by folding the top sheet and the back sheet so as to protrude on the top sheet side, so that the ridge lines of the first mountain fold and the second mountain fold are located at a higher position than the other region of the top sheet when the pet sheet is used. Therefore, liquid or solid pet excrement can be prevented from leaking outside the first mountain fold and the second mountain fold.

According to a further aspect of the pet sheet of the present invention, regions of the top sheet and the back sheet between the first mountain fold and the second mountain fold are configured as a retaining region for retaining the pet excrement. Further, a region on the opposite side of the first mountain fold from the retaining region and a region on the opposite side of the second mountain fold from the retaining region are held in contact with an intended place on which the pet sheet is placed when used as the pet sheet, and form a movement preventing part that prevents the pet sheet from moving with respect to the intended place.

According to this aspect, by provision of the first mountain fold and the second mountain fold, the regions of the top sheet and the back sheet between the first mountain fold and the second mountain fold serve as the retaining region for retaining the pet excrement. Further, by provision of the first mountain fold and the second mountain fold, the regions (also referred to as end regions) of the back sheet outside the first mountain fold and the second mountain fold are held in contact with the intended place (floor surface) on which the back sheet is placed when used as the pet sheet. In other words, the regions outside the first mountain fold and the second mountain fold are located in a lower position than the first mountain fold and the second mountain fold, so that the back sheet is reliably held in contact with the intended place (floor surface) on which the back sheet is placed. Friction is caused by contact between the end regions of the back sheet and the intended place and prevents movement of the pet sheet. Specifically, the end regions of the back sheet form a movement preventing part. Thus, the movement preventing part or the end regions of the pet sheet can prevent movement of the pet sheet. Further, the movement preventing part may further have a non-slip member affixed to the end regions of the back sheet.

According to a further aspect of the pet sheet of the present invention, the pet sheet is configured to be storable in a package, and in a stored state in which the pet sheet is stored in the package, the pet sheet is folded at the first mountain fold and the second mountain fold.

According to this aspect, by provision of the pet sheet that can be stored in the package by folding at the first mountain fold and the second mountain fold, the first mountain fold and the second mountain fold which are formed when the pet sheet is stored in the package can be utilized to prevent leakage of pet excrement when the pet sheet is used.

According to a further aspect of the pet sheet of the present invention, the first mountain fold is formed in parallel to the top sheet in one end region of each of the top sheet and the back sheet in a second direction crossing the first direction. Further, the second mountain fold is formed in the other end region of each of the top sheet and the back sheet in the second direction.

According to this aspect, the first mountain fold and the second mountain fold are formed in end regions near the ends of the pet sheet, so that the distance between the first mountain fold and the second mountain fold can be made longer. Specifically, a region for receiving pet excrement in the pet sheet can have a larger area.

According to a further aspect of the pet sheet of the present invention, the pet sheet has an absorber disposed between the top sheet and the back sheet. Further, low density parts having a lower density than the other region in the absorber are formed at the first mountain fold and the second mountain fold.

According to this aspect, by provision of the low density parts formed at the first mountain fold and the second mountain fold and having a lower density than the other region in the absorber, the liquid component or pet excrement is prevented from diffusing by the low density parts of the first mountain fold and the second mountain fold.

According to a further aspect of the pet sheet of the present invention, the absorber is bonded to the top sheet. Further, the top sheet is folded at the first mountain fold and the second mountain fold and irreversibly deforms.

According to this aspect, with the structure in which the top sheet irreversibly deforms with the absorber bonded to the top sheet, the density of the absorber arranged at the first mountain fold and the second mountain fold is lowered by irreversible deformation of the top sheet. By the low density parts formed in the absorber, the liquid component or pet excrement is prevented from diffusing.

According to a further aspect of the pet sheet of the present invention, the pet sheet has a rectangular shape, and the ridge lines of the first mountain fold and the second mountain fold are formed in parallel to each other. Further, preferably, the first direction coincides with a direction of long sides of the pet sheet and the ridge lines of the first mountain fold and the second mountain fold are formed in parallel to the long sides of the rectangular pet sheet. Further preferably, the ridge lines of the first mountain fold and the second mountain fold are formed in regions within 8 cm from the long sides of the pet sheet.

According to this aspect, with the structure in which the pet sheet has a rectangular shape and the ridge lines of the first mountain fold and the second mountain fold are arranged in parallel to the long sides of the pet sheet, the pet sheet can be rationally folded when the pet sheet is stored in the package. Further, with the structure in which the ridge lines of the first mountain fold and the second mountain fold are formed in the region within 8 cm from the long sides of the pet sheet, pet excrement can be received on an inner region 8 cm or more apart from the peripheral edge of the pet sheet and can be prevented from leaking out of the pet sheet. Generally, in pets such as dogs which are kept inside houses, the horizontal distance from a grounding point of a hind leg to an excreting part at the time of excretion is 8 cm or more in average. Therefore, when the pet excretes with its hind leg grounded on the pet sheet, the excrement is received in the region of the pet sheet between the first mountain fold and the second mountain fold. Therefore, it is rational that the ridge lines of the first mountain fold and the second mountain fold are formed in the regions of the pet sheet within 8 cm from the long sides of the pet sheet.

A pet sheet package according to the present invention includes a pet sheet for pet excrement which has a liquid-permeable top sheet and a liquid-impermeable back sheet, and a package in which the pet sheet is stored. The pet sheet has a first mountain fold and a second mountain fold that are formed by folding the top sheet and the back sheet so as to protrude on the top sheet side. The pet sheet is folded at the mountain folds and stored in the package. The pet sheet is configured such that the top sheet and the back sheet which extend on both sides of the first mountain fold and the second mountain fold are unfolded when used as the pet sheet. Further, ridge lines of the first mountain fold and the second mountain fold that are formed on the top sheet extend along a first direction parallel to the top sheet and continuously from one end to the other end of the top sheet in the first direction.

According to the present invention, by utilizing the first mountain fold and the second mountain fold at which the pet sheet is folded when stored in the package, liquid or solid pet excrement can be prevented from leaking outside the first mountain fold and the second mountain fold when the pet sheet is unfolded and used.

According to a further aspect of the pet sheet package of the present invention, regions of the top sheet and the back sheet between the first mountain fold and the second mountain fold are configured as a retaining region for retaining the pet excrement. Further, a region on the opposite side of the first mountain fold from the retaining region and a region on the opposite side of the second mountain fold from the retaining region are held in contact with an intended place on which the pet sheet is placed when used as the pet sheet, and form a movement preventing part that prevents the pet sheet from moving with respect to the intended place.

According to this aspect, by provision of the first mountain fold and the second mountain fold, the regions of the top sheet and the back sheet between the first mountain fold and the second mountain fold serve as the retaining region for retaining the pet excrement. Further, by provision of the first mountain fold and the second mountain fold, the regions of the back sheet outside the first mountain fold and the second mountain fold are held in contact with the intended place (floor surface) on which the back sheet is placed when used as the pet sheet. In other words, the regions outside the first mountain fold and the second mountain fold are located in a lower position than the first mountain fold and the second mountain fold, so that the back sheet is reliably held in contact with the intended place (floor surface) on which the back sheet is placed. The outside regions of the back sheet form a movement preventing part by contact of the back sheet with the intended place. Therefore, in the peripheral edge region of the pet sheet, the movement preventing part can prevent movement of the pet sheet. Further, the movement preventing part may further have a non-slip member affixed to the regions of the back sheet outside the first mountain fold and the second mountain fold.

According to a further aspect of the pet sheet package of the present invention, the first mountain fold is formed in parallel to the top sheet in one end region of each of the top sheet and the back sheet in a second direction crossing the first direction. Further, the second mountain fold is formed in the other end region of each of the top sheet and the back sheet in the second direction.

According to this aspect, the first mountain fold and the second mountain fold are formed in end regions near the ends of the pet sheet, so that the distance between the first mountain fold and the second mountain fold can be made longer. Specifically, the region for receiving the pet excrement in the pet sheet can have a larger area.

According to a further aspect of the pet sheet package of the present invention, the pet sheet is further folded between the first mountain fold and the second mountain fold in the second direction and stored in the package.

According to this aspect, by further folding the pet sheet between the first mountain fold and the second mountain fold, the pet sheet can be stored in smaller size in the package. Specifically, the pet sheet package can be reduced in size.

Effect of the Invention

According to the present invention, a new technique for preventing urine, etc. from leaking out from the pet sheet can be provided.

REPRESENTATIVE EMBODIMENT FOR PERFORMING THE INVENTION

An embodiment of the present invention is explained with reference to FIGS. 1 to 11. In this embodiment, a pet sheet 100 is explained as a representative embodiment of a pet sheet according to the present invention. A "pet" here widely includes vertebrates (mammals, reptiles, birds and amphibians) and invertebrates, and the pet sheet 100 is suitably used particularly for mammals such as cats, dogs, rabbits and hamsters.

Figure 1:
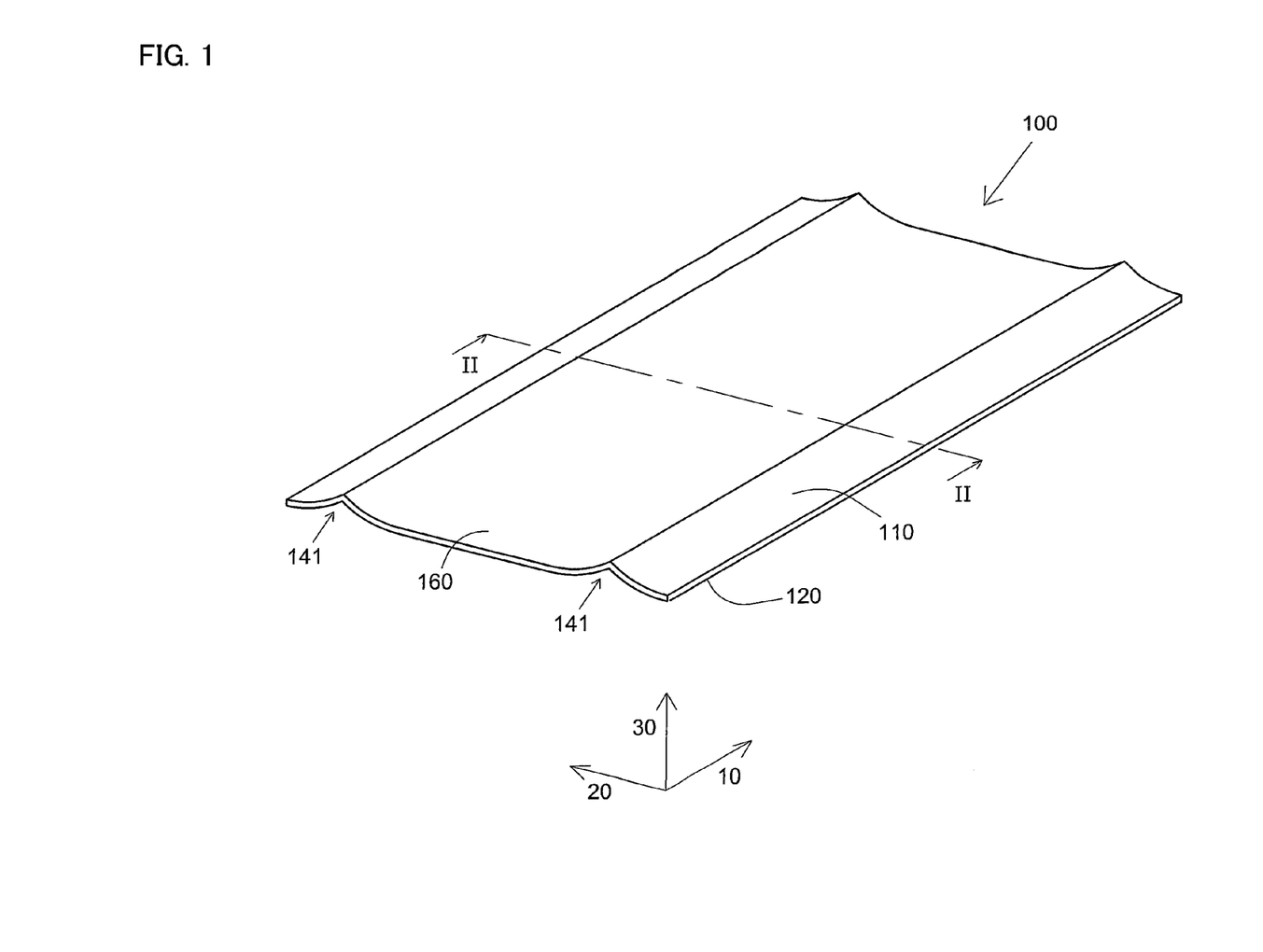
FIG. 1 is a perspective view showing an overall structure of a pet sheet according to an embodiment of the present invention.
Figure 2:
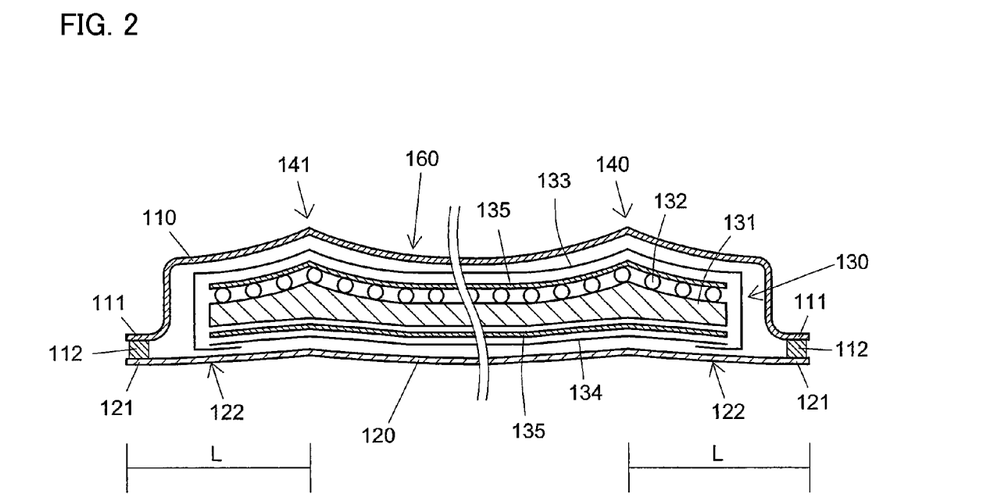
FIG. 2 is a sectional view taken along line II-II in FIG. 1.

As shown in FIG. 1, the pet sheet 100 is a flat sheet having a prescribed thickness. As shown in FIG. 2, the pet sheet 100 mainly includes a top sheet 110, a back sheet 120, and an absorber 130. The absorber 130 is held between the top sheet 110 and the back sheet 120. The pet sheet 100 is preferably configured as a rectangular or square sheet, but it may have a circular, elliptical or polygonal shape.

In FIG. 1, when a first direction 10 is a length direction of the pet sheet 100, a second direction 20 perpendicular to the first direction 10 corresponds to a width direction of the pet sheet 100. Further, a third direction 30 perpendicular to both the first direction 10 and the second directions 20 corresponds to a normal direction of the pet sheet 100.

The top sheet 110 and the back sheet 120 are rectangular sheets having about the same dimensions and have a substantially similar shape to the outer shape of the pet sheet 100. As shown in FIG. 2, the top sheet 110 is configured to receive excrement excreted from pets and is configured as a liquid-permeable sheet for allowing penetration of liquid such as urine. The back sheet 120 is arranged to face the top sheet 110 and is configured as a liquid-impermeable or water-repellent sheet for blocking or preventing penetration of liquid such as urine.

The top sheet 110 is preferably formed of thermoplastic nonwoven fabric. In this case, the whole or part of the top sheet 110 can be formed of thermoplastic nonwoven fabric. Further, a ridge line of the top sheet 110 along which the top sheet 110 is folded is formed so as not to completely disappear even when the top sheet 110 is unfolded. Specifically, the top sheet 110 is configured to irreversibly deform.

The back sheet 120 is preferably formed of a resin film sheet. It is sufficient for the back sheet 120 to be liquid-impermeable or water-repellent and can be formed by using a film of polyethylene, polypropylene, polyethylene terephthalate, etc. For example, the back sheet 120 can be formed by using a polyethylene film having a basis weight of 17 $g/m^2$. Further, nonwoven fabric to which a water repellent is applied can also be used as the back sheet 120. The [$g/m^2$] here represents a gram per square meter which measures basis weight, and when it is used below, its explanation is omitted.

The top sheet 110 and the back sheet 120 are configured to have a slightly larger shape than the absorber 130. A peripheral edge 111 of the top sheet 110 and a peripheral edge 121 of the back sheet 120 are overlaid one on the other and bonded together via a bonding layer 112. Thus, the absorber 130 is entirely covered with the top sheet 110 and the back sheet 120. As the bonding layer, a hot-melt adhesive, a heat sealer or an ultrasonic sealer can be typically used. The top sheet 110 and the back sheet 120 here are example embodiments that correspond to the "top sheet" and the "back sheet", respectively, according to the present invention.

As shown in FIG. 2, the absorber 130 has a prescribed thickness and mainly includes an absorber core layer 131, a dispersed layer 132, an upper carrier tissue 133 and a lower carrier tissue 134.

The absorber core layer 131 is typically configured as a layer formed by stacking fluff pulp so as to have a basis weight of 60 $g/m^2$. The dispersed layer 132 is typically configured as a layer formed by spraying high-absorbent polymers (also referred to as "SAP") on the absorber core layer 131 so as to have a basis weight of 39 $g/m^2$. The upper carrier tissue 133 and the lower carrier tissue 134 are typically formed of a tissue of conifer pulp (e.g. a tissue having a basis weight of 14 $g/m^2$).

The absorber core layer 131 and the dispersed layer 132 are arranged to be surrounded by the upper carrier tissue 133 and the lower carrier tissue 134, and are bonded to the lower carrier tissue 134 and the upper carrier tissue 133, respectively, via an adhesive layer 135 formed by a hot-melt adhesive. Further, the top of the absorber 130 and the top sheet 110 are bonded together by a hot-melt adhesive. The absorber 130 is an example embodiment that corresponds to the "absorber" according to the present invention.

The pet sheet 100 has a pet use mode in which the pet sheet is used in the unfolded state as shown in FIG. 1. The pet use mode includes a manner in which the pet sheet is directly put on floor or the like, and a manner in which the pet sheet is set on a holder and put on floor or the like.

Figure 3:
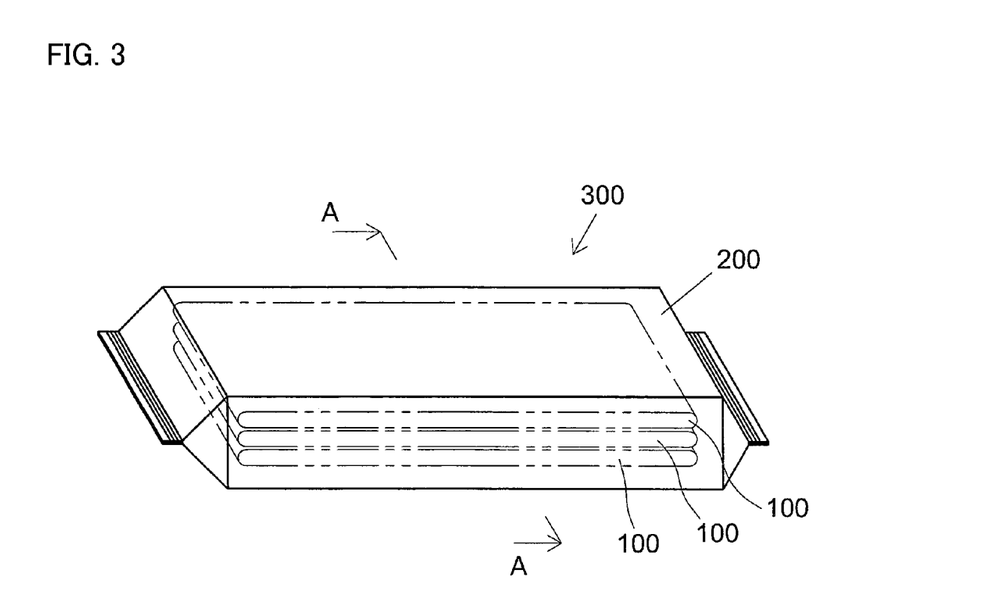
FIG. 3 is a perspective view showing an overall structure of a package according to an embodiment of the present invention.

As shown in FIG. 3, the pet sheet 100 has a storage mode in which the pet sheet 100 is stored in a package bag 200. Specifically, the pet sheet 100 is stored in the package bag 200, and the pet sheet 100 and the package bag 200 form a package 300. In this storage mode, a plurality of flat pet sheets 100 are prepared, folded in prescribed shape and stored in one package bag 200 for sale, display, transportation, etc. The package bag 200 is an example embodiment that corresponds to the "package" according to the present invention.

Manners of folding the pet sheet 100 and manners of storing the pet sheet 100 in the storage mode are now explained with reference to FIGS. 4 to 11.

Figure 4:
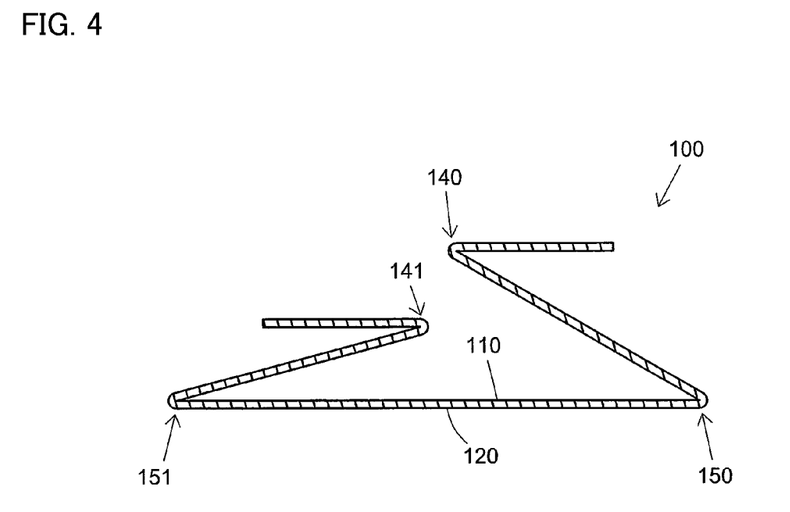
FIG. 4 is a sectional view for showing a first folding manner of the pet sheet corresponding to FIG. 2.

FIG. 4 shows a first folding manner for the pet sheet 100. In the first folding manner, first and second folds 140, 141 are formed to protrude on the top sheet 110 side and third and fourth folds 150, 151 are formed to protrude on the back sheet 120 side in the pet sheet 100. Specifically, the first and second folds 140, 141 are formed by mountain folding and the third and fourth folds 150, 151 are formed by valley folding, with the top sheet 110 as the upper side and the back sheet 120 as the lower side. The first to fourth folds 140, 141, 150, 151 extend in a long side direction of the pet sheet 100 (a direction of an arrow 10 in FIG. 1) and is continuously formed from end to end of the pet sheet 100.

When the pet sheet 100 is unfolded, the first fold 140 is formed in one end region of the pet sheet 100 in a short side direction of the pet sheet 100 (a direction of an arrow 20 in FIG. 1) and the second fold 141 is formed in the other end region. The third fold 150 and the fourth fold 151 are formed between the first fold 140 and the second fold 141 in the short side direction of the pet sheet 100. Specifically, any fold is not formed between both ends of the pet sheet 100 and the first and second folds 140, 141 in the short side direction of the pet sheet 100. The first fold 140 and the second fold 141 are example embodiments that correspond to the "first mountain fold" and the "second mountain fold", respectively, according to the present invention.

Figure 5:
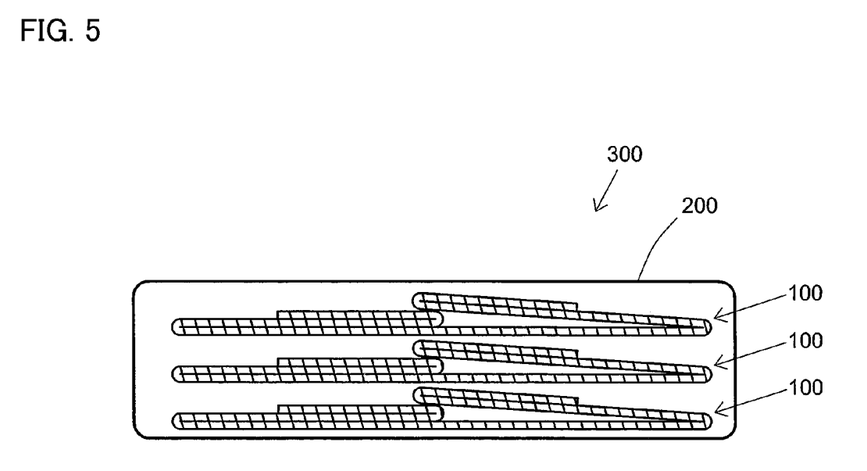
FIG. 5 is a sectional view taken along line A-A in FIG. 3 and showing the package that stores the pet sheets folded by the first folding manner.

As shown in FIG. 5, in a first storing manner, in order to form a package 300, the pet sheets 100 folded as shown in FIG. 4 are stacked on one another and packaged in the package bag 200. Further, the pet sheet 100 may also have a fold that extends in the short side direction of the pet sheet 100 (the direction of the arrow 20 in FIG. 1), in addition to the first to fourth folds 140, 141, 150, 151. Specifically, when stored in the package bag 200, the pet sheet 100 may be folded at the fold that extends in the short side direction of the pet sheet 100. The package 300 is an example embodiment that corresponds to the "pet sheet package" according to the present invention.

Figure 6:
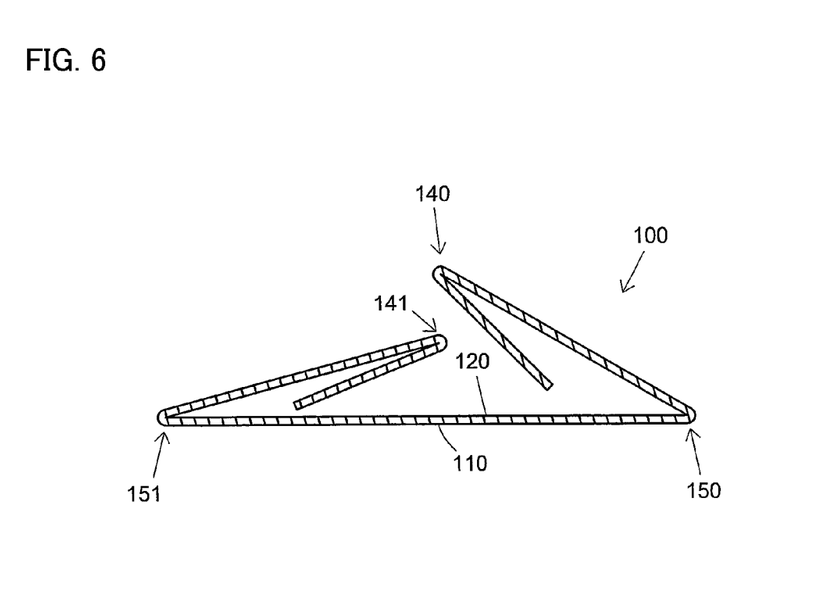
FIG. 6 is a sectional view for showing a second folding manner of the pet sheet corresponding to FIG. 2.

FIG. 6 shows a second folding manner for the pet sheet 100. In the second folding manner, the first fold 140, the second fold 141, the third fold 150 and the fourth fold 151 are formed to protrude on the top sheet 110 side in the pet sheet 100. Specifically, the first to fourth folds 140, 141, 150, 151 are formed by mountain folding, with the top sheet 110 as the upper side and the back sheet 120 as the lower side. The first to fourth folds 140, 141, 150, 151 extend in the long side direction of the pet sheet 100 (the direction of the arrow 10 in FIG. 1) and is continuously formed from end to end of the pet sheet 100.

When the pet sheet 100 is unfolded, the first fold 140 is formed in one end region of the pet sheet 100 in the short side direction of the pet sheet 100 (the direction of the arrow 20 in FIG. 1) and the second fold 141 is formed in the other end region. The third fold 150 and the fourth fold 151 are formed between the first fold 140 and the second fold 141 in the short side direction of the pet sheet 100. Specifically, any fold is not formed between the both ends of the pet sheet 100 and the first and second folds 140, 141 in the short side direction of the pet sheet 100. Two of the first to fourth folds 140, 141, 150, 151 are example embodiments that correspond to the "first mountain fold" and the "second mountain fold" according to the present invention.

Figure 7:
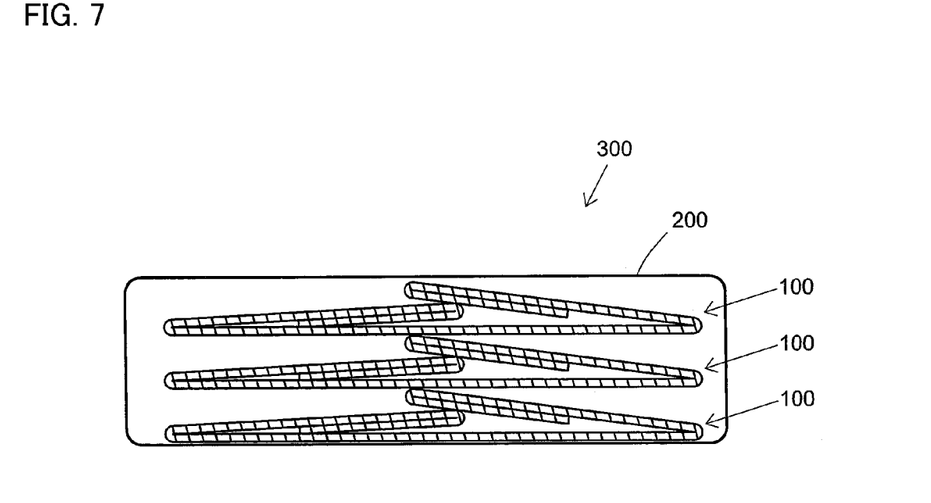
FIG. 7 is a sectional view taken along line A-A in FIG. 3 and showing the package that stores the pet sheets folded by the second folding manner.

As shown in FIG. 7, in a second storing manner, in order to form the package 300, the pet sheets 100 folded as shown in FIG. 6 are stacked on one another and packaged in the package bag 200. Further, the pet sheet 100 may also have a fold that extends in the short side direction of the pet sheet 100 (the direction of the arrow 20 in FIG. 1), in addition to the first to fourth folds 140, 141, 150, 151. Specifically, when stored in the package bag 200, the pet sheet 100 may be folded at the fold that extends in the short side direction of the pet sheet 100. The package 300 is an example embodiment that corresponds to the "pet sheet package" according to the present invention.

Figure 8:
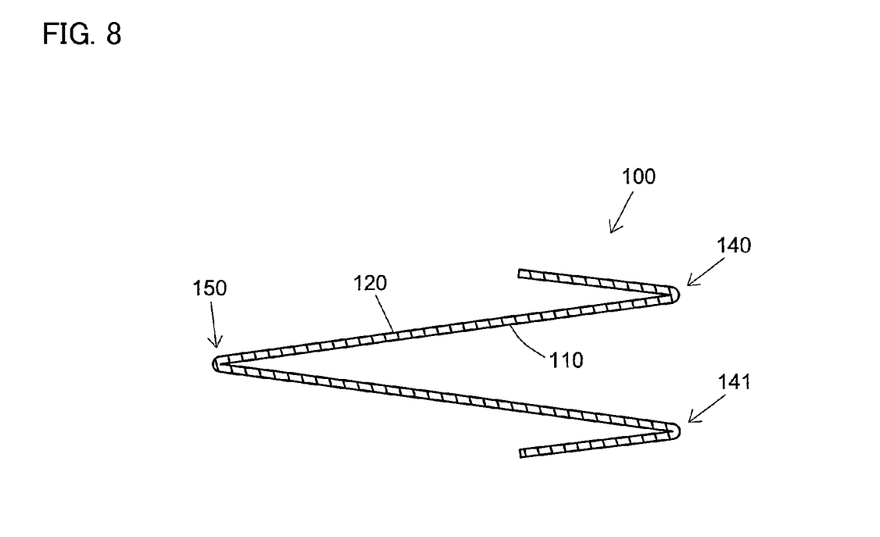
FIG. 8 is a sectional view for showing a third folding manner of the pet sheet corresponding to FIG. 2.

FIG. 8 shows a third folding manner for the pet sheet 100. In the third folding manner, the first fold 140 and the second fold 141 are formed to protrude on the top sheet 110 side and the third fold 150 is formed to protrude on the back sheet 120 side in the pet sheet 100. Specifically, the first and second folds 140, 141 are formed by mountain folding and the third fold 150 is formed by valley folding, with the top sheet 110 as the upper side and the back sheet 120 as the lower side. The first to third folds 140, 141, 150 extend in the long side direction of the pet sheet 100 (the direction of the arrow 10 in FIG. 1) and is continuously formed from end to end of the pet sheet 100.

When the pet sheet 100 is unfolded, the first fold 140 is formed in one end region of the pet sheet 100 in the short side direction of the pet sheet 100 (the direction of the arrow 20 in FIG. 1) and the second fold 141 is formed in the other end region. The third fold 150 is formed between the first fold 140 and the second fold 141 in the short side direction of the pet sheet 100.

Specifically, any fold is not formed between the both ends of the pet sheet 100 and the first and second folds 140, 141 in the short side direction of the pet sheet 100. The first fold 140 and the second folds 141 are example embodiments that correspond to the "first mountain fold" and the "second mountain fold", respectively, according to the present invention.

Figure 9:
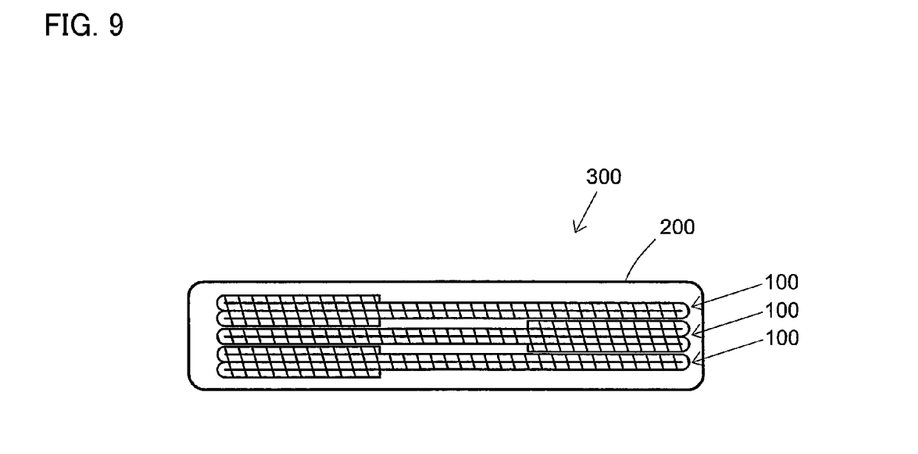
FIG. 9 is a sectional view taken along line A-A in FIG. 3 and showing the package that stores the pet sheets folded by the third folding manner.

As shown in FIG. 9, in a third storing manner, in order to form the package 300, the pet sheets 100 folded as shown in FIG. 8 are stacked on one another and packaged in the package bag 200. At this time, the pet sheets 100 are stacked such that end regions of the adjacent pet sheets 100 which are each folded at the first fold 140 and the second fold 141 do not overlap each other. Specifically, the bottommost pet sheet 100 is arranged with the first fold 140 and the second fold 141 on the left side as viewed in FIG. 9, and the next pet sheet 100 laid thereon is arranged with the first fold 140 and the second fold 141 on the right side as viewed in FIG. 9. Further, the pet sheet 100 may also have a fold that extends in the short side direction of the pet sheet 100 (the direction of the arrow 20 in FIG. 1), in addition to the first to third folds 140, 141, 150. Specifically, when stored in the package bag 200, the pet sheet 100 may be folded at the fold that extends in the short side direction of the pet sheet 100. The package 300 is an example embodiment that corresponds to the "pet sheet package" according to the present invention.

Figure 10:
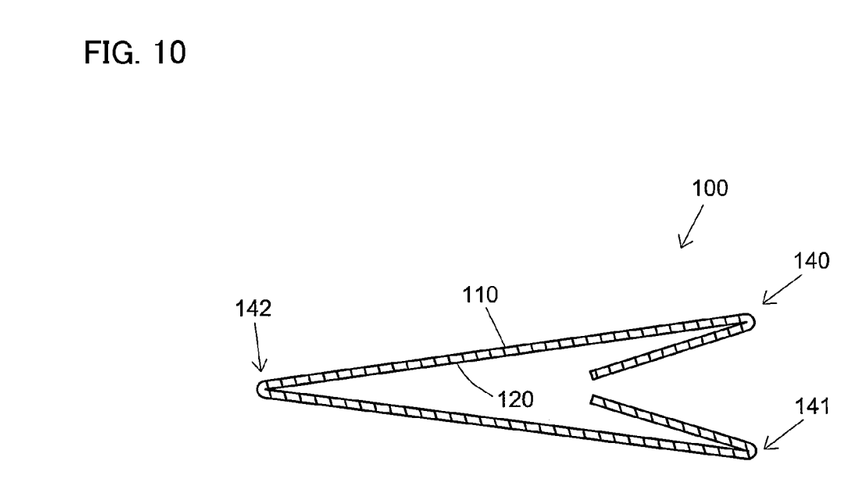
FIG. 10 is a sectional view for showing a fourth folding manner of the pet sheet corresponding to FIG. 2.

FIG. 10 shows a fourth folding manner for the pet sheet 100. In the fourth folding manner, the first fold 140, the second fold 141 and the third fold 142 are formed to protrude on the top sheet 110 side in the pet sheet 100. Specifically, the first to third folds 140, 141, 142 are formed by mountain folding, with the top sheet 110 as the upper side and the back sheet 120 as the lower side. The first to third folds 140, 141, 142 extend in the long side direction of the pet sheet 100 (the direction of the arrow 10 in FIG. 1) and is continuously formed from end to end of the pet sheet 100.

When the pet sheet 100 is unfolded, the first fold 140 is formed in one end region of the pet sheet 100 in the short side direction of the pet sheet 100 (the direction of the arrow 20 in FIG. 1) and the second fold 141 is formed in the other end region. The third fold 142 is formed between the first fold 140 and the second fold 141 in the short side direction of the pet sheet 100. Specifically, any fold is not formed between the both ends of pet sheet 100 and the first and second folds 140, 141 in the short side direction of the pet sheet 100. Two of the first to third folds 140, 141, 142 are example embodiments that correspond to the "first mountain fold" and the "second mountain fold" according to the present invention.

Figure 11:
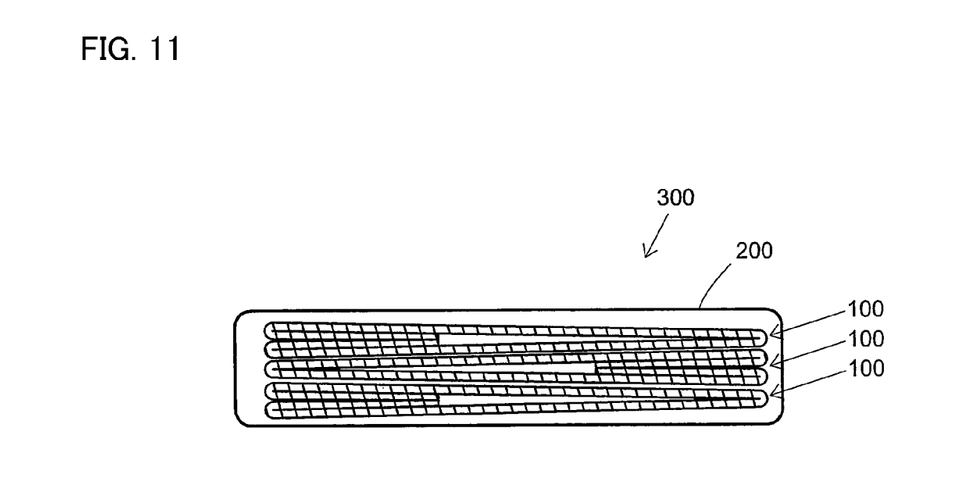
FIG. 11 is a sectional view taken along line A-A in FIG. 3 and showing the package that stores the pet sheets folded by the fourth folding manner.

As shown in FIG. 11, in a fourth storing manner, in order to form the package 300, the pet sheets 100 folded as shown in FIG. 10 are stacked on one another and packaged in the package bag 200. At this time, the pet sheets 100 are stacked such that end regions of the adjacent pet sheets 100 which are each folded at the first fold 140 and the second fold 141 do not overlap each other. Specifically, the bottommost pet sheet 100 is arranged with the first fold 140 and the second fold 141 on the left side as viewed in FIG. 11, and the next pet sheet 100 laid thereon is arranged with the first fold 140 and the second fold 141 on the right side as viewed in FIG. 11. Further, the pet sheet 100 may also have a fold that extends in the short side direction of the pet sheet 100 (the direction of the arrow 20 in FIG. 1), in addition to the first to third folds 140, 141, 142. Specifically, when stored in the package bag 200, the pet sheet 100 may be folded at the fold that extends in the short side direction of the pet sheet 100. The package 300 is an example embodiment that corresponds to the "pet sheet package" according to the present invention.

In the first to fourth folding manners, each of the first fold 140 and the second fold 141 is preferably formed in a region within 8 cm from the end of the pet sheet 100. Further, the folds may be symmetrically or asymmetrically arranged in the pet sheet 100.

The pet use mode of the pet sheet 100 is now explained. As shown in FIG. 1, any of the pet sheets 100 folded in the first to fourth folding manners is configured such that the top sheet 110 receives excrement excreted from pets on the upper surface side with the pet sheet 100 unfolded and the back sheet 120 placed on floor or the like. Further, in FIG. 1, only the first fold 140 and the second fold 141 are shown and the other folds are not shown.

Even when the pet sheet 100 is taken out of the package bag 200 and unfolded, each of the ridge lines of the first fold 140 and the second fold 141 is kept in the original state since the top sheet 110 is configured to irreversibly deform. Thus, the ridge lines of the first fold 140 and the second fold 141 are held at a higher position above the floor surface than the other region of the pet sheet 100.

With the structure in which the ridge lines of the first fold 140 and the second fold 141 are held at a higher position above the floor surface than the other region of the pet sheet 100, regions of the back sheet 120 outside the first fold 140 and the second fold 141 are reliably held in contact with the floor surface under the weight of the first fold 140 and the second fold 141. Specifically, contact regions 122 are provided which are reliably held in contact with the floor surface. Therefore, by friction between the contact regions 122 and the floor surface, the pet sheet 100 can be prevented from moving (slipping) in the surface direction of the pet sheet. The contact region 122 is an example embodiment that corresponds to the "movement preventing part" according to the present invention.

With the structure in which the absorber 130 is entirely bonded to the top sheet 110 by the adhesive, like the regions of the top sheet 110 at the first fold 140 and the second fold 141, the side of the absorber 130 bonded to the top sheet 110 are kept in the folded shape even when the pet sheet 100 is unfolded. On the other hand, the other side of the absorber 130 that faces the back sheet 120 deforms to return to its initial state together with the back sheet 120. Thus, the regions of the absorber 130 at the first fold 140 and the second fold 141 cause delamination so that the density of the regions gets lower than that of the other region. Specifically, low density parts are partially formed in the absorber 130 at the first fold 140 and the second fold 141. The low density part is an example embodiment that corresponds to the "low density part" according to the present invention.

The first fold 140 and the second fold 141 are formed in regions within the distance (shown by L in FIG. 2) of 8 cm from the ends of the pet sheet 100. Inventors conducted an investigation on fifteen dogs which are generally kept as pets and have a weight of 4 kg or more.

As a result, it is found that the average weight of the fifteen dogs is 6.2 kg and the average distance from an outermost point of a hind leg to an excreting part (such as anus) is 8 cm. Further, considering that medium-size or bigger dogs excrete a larger amount of excrement than small dogs, dogs having a weight of 4 kg or more are selected as objects to be investigated. Specifically, when the dogs excrete on the pet sheet 100, excrement is excreted on an inner region 8 cm or more apart from the ends of the pet sheet 100. Therefore, a region of the pet sheet 100 between the first fold 140 and the second fold 141 is defined as an excretion region 160 in which excrement is excreted. The excretion region 160 is an example embodiment that corresponds to the "retaining region" according to the present invention.

A liquid component of the excrement excreted on the excretion region 160 not only penetrates the liquid-permeable top sheet 110 toward the absorber 130 but also diffuses on the surface and/or inside of the top sheet 110. With the structure in which the ridge lines of the first fold 140 and the second fold 141 are held at a higher position above the floor surface than the other region of the pet sheet 100, however, the liquid component that diffuses on the surface and/or inside of the top sheet 110 can be prevented from leaking out into the regions outside the first fold 140 and the second fold 141.

Further, a liquid component that reached the absorber 130 also diffuses in the inside of the absorber 130 in the surface direction of the absorber 130. With the structure in which the low density parts are partially formed in the absorber 130 at the first fold 140 and the second fold 141, however, the liquid component that diffuses in the inside of the absorber 130 can be prevented from leaking out into the regions outside the first fold 140 and the second fold 141.

According to the above-described embodiment, in the storage mode in which the pet sheet 100 is stored in the package bag 200, the pet sheet 100 is folded at the first fold 140 and the second fold 141 and stored. In the pet use mode, the first fold 140 and the second fold 141 of the pet sheet 100 prevent leakage of a liquid component of excrement into the regions outside the first fold 140 and the second fold 141. Specifically, the liquid component of the excrement can be prevented from leaking out by utilizing the folds of the pet sheet 100 in the storage mode.

According to this embodiment, with the structure in which the pet sheet 100 has a rectangular shape and the ridge lines of the first fold 140 and the second fold 141 are formed in parallel to the long sides of the pet sheet 100, the pet sheet 100 can be rationally folded.

According to this embodiment, with the structure in which the absorber 130 is bonded to the top sheet 110, simply by unfolding the pet sheet 100 folded at the first fold 140 and the second fold 141, the low density parts having a lower density than the other region in the absorber 130 can be easily formed at the first fold 140 and the second fold 141.

In the above-described embodiment, the pet sheet 100 has a rectangular shape, but it may have any other shape. Further, the ridge lines of the first fold 140 and the second fold 141 do not have to be formed in parallel to the long sides of the pet sheet 100, and the ridge line of the first fold 140 does not have to be formed in parallel to the ridge line of the second fold 141.

In the above-described embodiment, the first fold 140 and the second fold 141 are formed in parallel to the long sides of the pet sheet 100, but they may be formed in parallel to the short sides of the pet sheet 100.

In the above-described embodiment, the first fold 140 and the second fold 141 are formed in parallel to the long sides of the pet sheet 100, but a third fold and a fourth fold may be additionally formed in parallel to the short sides of the pet sheet 100 in such a manner as to connect the first fold 140 and the second fold 141 and protrude on the top sheet 110 side.

In the above-described embodiment, the absorber 130 may be formed of hydrophilic fibers containing a cationic surfactant. The cationic surfactant binds to the hydrophilic fibers, so that, when the pet sheet 100 folded at the first fold 140 and the second fold 141 is unfolded, the hydrophilic fibers of the first fold 140 and the second fold 141 more easily delaminate from each other and thus the low density parts are more easily formed.

In the above-described embodiment, the absorber 130 may be formed of recycled hydrophilic fibers. By provision of the absorber 130 containing the recycled hydrophilic fibers, the once opened hydrophilic fibers are opened again, so that the hydrophilic fibers have a shorter fiber length. Therefore, when the pet sheet 100 folded at the first fold 140 and the second fold 141 is unfolded, the hydrophilic fibers of the first fold 140 and the second fold 141 more easily delaminate, so that the low density parts are more easily formed.

In the above-described embodiment, by unfolding the pet sheet 100 folded at the first fold 140 and the second fold 141, the low density parts which have a lower density than the other region in the absorber 130 are formed at the first fold 140 and the second fold 141, but the present invention is not limited to this. The pet sheet 100 may be configured such that the density of the regions of the absorber 130 corresponding to the first fold 140 and the second fold 141 is lowered by preliminarily providing the absorber 130 having a low density at the first fold 140 and the second fold 141.

In the above-described embodiment, the regions of the back sheet 120 that come in contact with the floor surface outside the first fold 140 and the second fold 141 are configured as the movement preventing part. In addition, however, a non-slip member formed of rubber, resin, etc. may be affixed to the side of the back sheet 120 that comes in contact with the floor surface.

(Correspondences Between the Features of the Embodiment and the Features of the Invention)

The above-described embodiment is a representative example for embodying the present invention. Therefore, the present invention is not limited to the structures that have been described as the representative embodiment. Correspondences between the features of the embodiments and the features of the invention are as follow.

The pet sheet 100 is an example embodiment that corresponds to the "pet sheet" according to the present invention.

The top sheet 110 is an example embodiment that corresponds to the "top sheet" according to the present invention.

The back sheet 120 is an example embodiment that corresponds to the "back sheet" according to the present invention.

The contact region 122 is an example embodiment that corresponds to the "movement preventing part" according to the present invention.

The absorber 130 is an example embodiment that corresponds to the "absorber" according to the present invention.

The absorber core layer 131 is an example embodiment that corresponds to the "absorbent layer" according to the present invention.

The dispersed layer 132 is an example embodiment that corresponds to the "absorbent layer" according to the present invention.

The upper carrier tissue 133 is an example embodiment that corresponds to the "covering layer" according to the present invention.

The lower carrier tissue 134 is an example embodiment that corresponds to the "covering layer" according to the present invention.

The first fold 140 is an example embodiment that corresponds to the "first mountain fold" according to the present invention.

The second fold 141 is an example embodiment that corresponds to the "second mountain fold" according to the present invention.

The package bag 200 is an example embodiment that corresponds to the "package" according to the present invention.

The low density part that is partially formed in each of the regions of the absorber 130 corresponding to the first fold 140 and the second fold 141 is an example embodiment that corresponds to the "low density part" according to the present invention.

The excretion region 160 is an example embodiment that corresponds to the "retaining region" according to the present invention.

The package 300 is an example embodiment that corresponds to the "pet sheet package" according to the present invention.

The direction of the arrow 10 is an example embodiment that corresponds to the "first direction" according to the present invention. The direction of the arrow 20 is an example embodiment that corresponds to the "second direction" according to the present invention.

The excretion region 160 is an example embodiment that corresponds to the "inner region" in an aspect of the invention.

In view of the object of the above-described invention, the pet sheet and the pet sheet package of this invention can have the following features.

(Aspect 1)

"A pet sheet for pet excrement, having a liquid-permeable top sheet and a liquid-impermeable back sheet, comprising:

a first mountain fold and a second mountain fold that are formed by folding the top sheet and the back sheet so as to protrude on the top sheet side, wherein:

the pet sheet is configured such that the top sheet and the back sheet which extend on both sides of the first mountain fold and the second mountain fold are unfolded when used as the pet sheet, and ridge lines of the first mountain fold and the second mountain fold that are formed on the top sheet extend along a first direction parallel to the top sheet and continuously from one end to the other end of the top sheet in the first direction."

(Aspect 2)

"The pet sheet as defined in aspect 1, wherein regions of the top sheet and the back sheet between the first mountain fold and the second mountain fold are configured as a retaining region for retaining the pet excrement."

(Aspect 3)

"The pet sheet as defined in aspect 2, wherein a region on the opposite side of the first mountain fold from the retaining region and a region on the opposite side of the second mountain fold from the retaining region are held in contact with an intended place on which the pet sheet is placed when used as the pet sheet, and thereby form a movement preventing part that prevents the pet sheet from moving with respect to the intended place."

(Aspect 4)

"The pet sheet as defined in any one of aspects 1 to 3, wherein the pet sheet is configured to be storable in a package, and in a stored state in which the pet sheet is stored in the package, the pet sheet is folded at the first mountain fold and the second mountain fold."

(Aspect 5)

"The pet sheet as defined in any one of aspects 1 to 4, wherein the first mountain fold is formed in parallel to the top sheet in one end region of each of the top sheet and the back sheet in a second direction crossing the first direction, and the second mountain fold is formed in the other end region of each of the top sheet and the back sheet in the second direction."

(Aspect 6)

"The pet sheet as defined in any one of aspects 1 to 5, comprising an absorber disposed between the top sheet and the back sheet, wherein low density parts having a lower density than the other region in the absorber are formed at the first mountain fold and the second mountain fold."

(Aspect 7)

"The pet sheet as defined in aspect 6, wherein the absorber is bonded to the top sheet, and the top sheet is folded at the first mountain fold and the second mountain fold and irreversibly deforms."

(Aspect 8)

"The pet sheet as defined in any one of aspects 1 to 7, wherein the pet sheet has a rectangular shape."

(Aspect 9)

"The pet sheet as defined in aspect 8, wherein the ridge lines of the first mountain fold and the second mountain fold are formed in parallel to each other."

(Aspect 10)

"The pet sheet as defined in aspect 9, wherein the first direction coincides with a direction of long sides of the pet sheet, and the ridge lines are formed in parallel to the long sides."

(Aspect 11)

"The pet sheet as defined in aspect 10, wherein the ridge lines of the first mountain fold and the second mountain fold are formed in regions within 8 cm from the long sides of the pet sheet."

(Aspect 12)

"The pet sheet as defined in any one of aspects 1 to 11, comprising:

a third mountain fold and a fourth mountain fold that extend in parallel to the top sheet and in a second direction crossing the first direction, wherein:

the third mountain fold and the fourth mountain fold continuously extend from the first mountain fold to the second mountain fold and are formed by folding the top sheet and the back sheet so as to protrude on the top sheet side."

(Aspect 13)

"The pet sheet as defined in any one of aspects 1 to 5, comprising:

an absorber disposed between the top sheet and the back sheet, wherein:

the absorber has an absorbent layer that is capable of absorbing liquid, and the absorbent layer extends in parallel to the top sheet and extends to regions closer to both ends of the pet sheet than the first mountain fold and the second mountain fold in the second direction crossing the first direction."

(Aspect 14) "The pet sheet as defined in aspect 13, wherein:

the absorber has a covering layer that covers the absorbent layer, and the covering layer is arranged between the absorbent layer and the top sheet and between the absorbent layer and the back sheet."

(Aspect 15)

"The pet sheet as defined in aspect 14, wherein the covering layer covers a top of the absorbent layer and both ends of the absorbent layer in the second direction and is arranged to continuously extend down to a lower surface of the absorbent layer."

(Aspect 16)

"A pet sheet package, comprising the pet sheet as defined in any one of aspects 1 to 15 and a package that stores the pet sheet."

(Aspect 17)

"The pet sheet package as defined in aspect 16, wherein:

the pet sheet has end regions that extend along both ends of the pet sheet outside the first mountain fold and the second mountain fold in a surface direction of the pet sheet, and an inner region that is located on the opposite side of the first mountain fold and the second mountain fold from the end regions in the surface direction of the pet sheet, when the pet sheet folded at the first mountain fold and the second mountain fold is unfolded, the pet sheet is folded such that the end regions are overlaid on the inner region and is stored in the package, and the pet sheets are stacked on one another such that the end regions of adjacent ones of the pet sheets do not overlap each other, and are stored in the package."

(Aspect 18)

"The pet sheet package as defined in aspect 17, wherein the pet sheet is folded such that the end regions and the inner region of the top sheet come in contact with each other, and is stored in the package."

DESCRIPTION OF NUMERALS 100 pet sheet
110 top sheet
111 peripheral edge
112 bonding layer
120 back sheet
121 peripheral edge
122 contact region
130 absorber
131 absorber core layer
132 dispersed layer
133 upper carrier tissue
134 lower carrier tissue
135 adhesive layer
140 first fold
141 second fold
142 third fold
150 third fold
151 fourth fold
160 excretion region
200 package bag
300 package

The invention claimed is:

1. A pet sheet for pet excrement having a liquid-permeable top sheet and a liquid-impermeable back sheet, said pet sheet comprising:
a first mountain fold and a second mountain fold that are formed by folding the top sheet and the back sheet so as to protrude on the top sheet side, wherein:
the pet sheet is configured such that the top sheet and the back sheet which extend on both sides of the first mountain fold and the second mountain fold are unfolded when used as the pet sheet,
ridge lines of the first mountain fold and the second mountain fold that are formed on the top sheet extend along a first direction parallel to the top sheet and continuously from one end to the other end of the top sheet in the first direction, and
an absorber that is disposed between the top sheet and the back sheet, wherein low density parts having a lower density than another region in the absorber are formed at the first mountain fold and the second mountain fold.

2. The pet sheet as defined in claim 1, wherein regions of the top sheet and the back sheet between the first mountain fold and the second mountain fold are configured as a retaining region for retaining the pet excrement.

3. The pet sheet as defined in claim 2, wherein a region on the opposite side of the first mountain fold from the retaining region and a region on the opposite side of the second mountain fold from the retaining region are held in contact with an intended place on which the pet sheet is placed when used as the pet sheet, and thereby form a movement preventing part that prevents the pet sheet from moving with respect to the intended place.

4. The pet sheet as defined in claim 1, wherein the pet sheet is configured to be storable in a package, and in a stored state in which the pet sheet is stored in the package, the pet sheet is folded at the first mountain fold and the second mountain fold.

5. The pet sheet as defined in claim 1, wherein the first mountain fold is formed in parallel to the top sheet in one end region of each of the top sheet and the back sheet in a second direction crossing the first direction, and the second mountain fold is formed in another end region of each of the top sheet and the back sheet in the second direction.

6. The pet sheet as defined in claim 1, wherein the absorber is bonded to the top sheet, and the top sheet is folded at the first mountain fold and the second mountain fold and irreversibly deforms.

7. The pet sheet as defined in claim 1, wherein the pet sheet has a rectangular shape.

8. The pet sheet as defined in claim 7, wherein the ridge lines of the first mountain fold and the second mountain fold are formed in parallel to each other.

9. The pet sheet as defined in claim 8, wherein the first direction coincides with a direction of long sides of the pet sheet, and the ridge lines are formed in parallel to the long sides.

10. The pet sheet as defined in claim 9, wherein the ridge lines of the first mountain fold and the second mountain fold are formed in regions within 8 cm from the long sides of the pet sheet.

11. A pet sheet package, including a pet sheet for pet excrement which has a liquid-permeable top sheet and a liquid-impermeable back sheet, and a package in which the pet sheet is stored, wherein:
the pet sheet has a first mountain fold and a second mountain fold that are formed by folding the top sheet and the back sheet so as to protrude on the top sheet side,
the pet sheet is folded at the mountain folds and stored in the package, the pet sheet is configured such that the top sheet and the back sheet which extend on both sides of the first mountain fold and the second mountain fold are unfolded when used as the pet sheet,
ridge lines of the first mountain fold and the second mountain fold that are formed on the top sheet extend along a first direction parallel to the top sheet and continuously from one end to the other end of the top sheet in the first direction, and
an absorber that is disposed between the top sheet and the back sheet, wherein low density parts having a lower density than another region in the absorber are formed at the first mountain fold and the second mountain fold.

12. The pet sheet package as defined in claim 11, wherein regions of the top sheet and the back sheet between the first mountain fold and the second mountain fold are configured as a retaining region for retaining the pet excrement.

13. The pet sheet package as defined in claim 12, wherein: a region on an opposite side of the first mountain fold from the retaining region and a region on an opposite side of the second mountain fold from the retaining region are held in contact with an intended place on which the pet sheet is placed when used as the pet sheet, and thereby form a movement preventing part that prevents the pet sheet from moving with respect to the intended place.

14. The pet sheet package as defined in claim 11, wherein:
the first mountain fold is formed in parallel to the top sheet in one end region of each of the top sheet and the back sheet in a second direction crossing the first direction, and
the second mountain fold is formed in another end region of each of the top sheet and the back sheet in the second direction.

15. The pet sheet package as defined in claim 14, wherein the pet sheet is further folded between the first mountain fold and the second mountain fold in the second direction and stored in the package.

* * * * *